US008321867B1

(12) United States Patent
Holl, II et al.

(10) Patent No.: US 8,321,867 B1
(45) Date of Patent: Nov. 27, 2012

(54) REQUEST PROCESSING FOR STATELESS CONFORMANCE ENGINE

(75) Inventors: James H. Holl, II, Los Gatos, CA (US);
Peter Smoot, San Jose, CA (US); Sahn Lam, Sunnyvale, CA (US); Anawat Chanhunthod, Saratoga, CA (US);
Hemanth Pannem, Satyavedu (IN)

(73) Assignee: Network Appliance, Inc., Sunnyvale, CA (US)

( * ) Notice: Subject to any disclaimer, the term of this patent is extended or adjusted under 35 U.S.C. 154(b) by 1086 days.

(21) Appl. No.: 12/019,589

(22) Filed: Jan. 24, 2008

(51) Int. Cl.
*G06F 9/46* (2006.01)
(52) U.S. Cl. ............................ 718/102; 714/48; 714/49
(58) Field of Classification Search .................. 718/102; 714/5, 48, 49; 707/100
See application file for complete search history.

(56) References Cited

U.S. PATENT DOCUMENTS

| | | | |
|---|---|---|---|
| 5,568,629 A | 10/1996 | Gentry et al. | |
| 5,889,934 A | 3/1999 | Peterson | |
| 6,801,992 B2 | 10/2004 | Gajjar et al. | |
| 7,127,577 B2 | 10/2006 | Koning et al. | |
| 7,237,021 B2 | 6/2007 | Penny et al. | |
| 2005/0033757 A1* | 2/2005 | Greenblatt et al. | 707/100 |
| 2005/0193231 A1* | 9/2005 | Scheuren | 714/5 |
| 2006/0080503 A1* | 4/2006 | Araki et al. | 711/113 |
| 2006/0149623 A1* | 7/2006 | Badros et al. | 705/14 |
| 2007/0088702 A1 | 4/2007 | Fridella et al. | |
| 2007/0268822 A1* | 11/2007 | Brunswig et al. | 370/229 |
| 2008/0208917 A1 | 8/2008 | Smoot et al. | |
| 2009/0007034 A1* | 1/2009 | Granovsky et al. | 716/5 |

OTHER PUBLICATIONS

Alvarez, Guillermo, et al., "MINERVA: An Automated Resource Provisioning Tool for Large-Scale Storage Systems," ACM Transactions on Computer Systems, vol. 19, No. 4, Nov. 2001, pp. 183-518.
Anderson, Eric, et al., "Quickly Finding Near-Optimal Storage Designs," ACM Transactions on Computer Systems, vol. 23, No. 4, Nov. 2005, pp. 337-374.
Galb, Jack, et al., "System-Managed Storage," IBM Systems Journal, vol. 28, No. 1, 1989, pp. 77-103.
Zadok, Erez, et al, "Reducing Storage Management Cost Via Informed User-Based Policies," Technical Report FSL-03-01, pp. 1-16, 2004.

* cited by examiner

*Primary Examiner* — Thomas Lee
*Assistant Examiner* — Xuxing Chen
(74) *Attorney, Agent, or Firm* — Blakely, Sokoloff, Taylor & Zafman LLP

(57) ABSTRACT

A method and an apparatus to increase conformance of a storage implementation of a data set to a storage policy are presented. In one embodiment, the method includes performing a conformance check of a data set state and an associated data management policy. The method includes identifying a set of tasks that can be performed to increase conformance of the data set state to the associated policy, and generating a task list using tasks from the set of tasks. The method further includes outputting an indication of the task list to a user and accepting from the user an approval of the task list before generating and executing a second task list.

23 Claims, 8 Drawing Sheets

REQUEST PROCESSING FOR STATELESS CONFORMANCE ENGINE

TECHNICAL FIELD

The present invention relates to networked data storage systems, and more particularly, to managing data storage using data sets.

BACKGROUND

A networked data storage system can be used for a variety of purposes, such as providing multiple users access to shared data, or facilitating backups or data mirroring. A networked data storage system may include a number of storage servers. A storage server provides services related to the accessing and organizing data on mass storage devices, such as disks. Some storage servers are commonly referred to as file servers, as these storage servers provide clients with block-level access to data. Some storage servers provide clients with sub-file level access to data (e.g., block-level access). An example of a storage server is any of the file server products made by Network Appliance, Inc. in Sunnyvale, Calif. A storage server may be implemented with a special-purpose computer or a general-purpose computer programmed in a particular way. Depending on the application, various networked storage systems may include different numbers of storage servers.

Logical units of storage may be created and manipulated on storage servers, such as files, directories, volumes, qtrees (which is a subset of a volume, optionally associated with a space usage quota), logical unit numbers (LUNs), etc. Such logical units are referred to as storage objects in this document. Creating a single storage object is typically fast and easy, but managing a storage object over time is more difficult. A storage administrator has to make numerous decisions, such as how to monitor the available space for the storage object, how to schedule data backups, how to configure backups, whether the data should be mirrored, where data should be mirrored, etc. Answers to the above questions may be summarized in a data management policy. When the data management policy is determined, the administrator works to ensure that the policy is correctly implemented on all relevant storage objects, that the required space is available, that the data protection operations succeed, and the like. If the administrator decides to change the policy (for example, extending the amount of time that backups should be retained), the administrator normally must find all of the affected storage objects and then manually re-configure all of the relevant settings.

As the number of storage objects grows in the system, the administrator's job becomes more difficult and complex. It becomes increasingly likely that the administrator may not readily determine what policy was supposed to apply to a given storage object, or why a given volume is mirrored (e.g., copying data from a given volume to a backup volume so that the data can be recovered). In addition, the administrator normally has to perform many tedious manual tasks for each storage object, which can be error prone and unreliable. A large data center may have hundreds to over a thousand storage servers. Each storage server may manage hundreds of storage objects (e.g., volumes and thousands of qtrees). This leads to a total of tens to hundreds of thousands of storage objects to manage with a similar number of backup and mirror relationships. The number of objects typically grows faster than the number of administrators that are employed, so each administrator manages more and more objects over time. Eventually, the sheer number of objects makes it increasingly less economical, if not impossible, for an administrator to reliably implement data management policies and to accurately check for conformance to the data management policies.

A data management policy is used to describe how stored data is to be protected against data loss. The policy describes an intended behavior for data storage using storage objects. In some embodiments, a data management policy may be represented by a tree graph having a number of nodes and branches. FIG. 6 shows a tree graph of one embodiment of a data management policy. The tree graph 610 includes nodes 611-626 and branches 651-655. Each node represents a storage object and is coupled to another node via a branch, which describes the relationship between the two corresponding storage objects. For example, branch 653 is marked as a "backup" connection between nodes 612 and 614. Thus, storage object represented by node 614 is a backup copy of the storage object 612. Backup copies of storage objects thus provide redundant storage. Another relationship that can be specified is a "snapshot" process in which the active tile system (e.g., a file system to which data can be both written and read) at the storage site is captured and the "snapshot" is transmitted as a whole, over a network to the remote storage site. A snapshot is a persistent point in time (PPT) image of the active file system that enables quick recovery of data after data has been corrupted, lost, or altered. Snapshots can be created by copying the data at each predetermined point in time to form a consistent image, or virtually, by using a pointer to form the image of the data. Accordingly, the graph 610 represents how the administrator intends to manage data in the data storage system.

Conformance is determined by comparing the configuration of storage objects actually used to store a data set against a set of user-defined policies and configurations. If the policies are not being adhered to, then the system is out of conformance. Software applications have been written to attempt to help ease the burden of management for ensuring conformance with data management policies.

In conventional policy-driven management applications (such as IBM Tivoli, HP OpenView, Calif. Unicenter, and BMC Patrol), an administrator is normally expected to understand the state of the systems under management and to know what changes should be made to the system to accomplish a goal. A storage management application from Replicus allows a user to specify levels of redundancy but does not allow a user to see the consequences of the specification before applying the results. Additionally, the conventional management applications do not scale well as the complexities of data storage systems grow in an exponential fashion. Furthermore, conventional approaches use an "if-then" approach for every state of a system and do not abstract away many of the technical details that administrators may not understand nor would care to deal with. Thus, calculating actions to perform for reconfiguring a system in response to a given policy change is of unbounded complexity as systems become more complex, and storage administrators desire help in identifying nonconformities, abstracting details, and determining the effects of bringing a system into conformance.

SUMMARY

The present disclosure includes a method and an apparatus to provide request processing for a stateless conformance engine. A state is a unique configuration of information in a program or machine or "engine." A state machine is a behavioral model that is composed of a finite number of states, transitions between those states, and actions that describe an activity to be performed at a given point. In contrast, the conformance engine is stateless because the conformance engine does not need to have rules that describe an existing state of a storage system and the actions that are to be taken to bring the storage system as it currently exists into a state of conformance. The state of conformance can be determined by comparing a state of a data set against a data management policy associated with the data set to determine if the data set currently conforms to the data management policy. The method includes performing a conformance check of a state of a data set and an associated data management policy. The method includes identifying a set of tasks that can be performed to increase conformance of the data set state to the associated policy, and generating a task list using tasks from the set of tasks. The method further includes outputting an indication of the task list to a user and accepting from the user an approval of the task list (a dry-run task list) before generating and executing a second task list (the task list to be actually executed).

Other features of the present disclosure will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to provide request processing for a stateless conformance engine are described. In the following description, numerous specific details are set forth. However, it is understood that embodiments of the invention may be practiced without these specific details. In other instances, well-known components, structures, and techniques have not been shown in detail in order not to obscure the understanding of this description.

In one embodiment, the method includes automatically measuring the conformance of a data set having a set of storage objects to a data management policy, and allowing an administrator of a network data storage system to view a report of the conformance (or lack of conformance). Each storage object may include logical representations of a collection of data and replicas of the collection of data. The collection of data is normally stored in one or more storage containers. A storage container can be a device used for long-term storage of memory, such as a disk, RAID group, plex (of one or more RAID groups), aggregate (of plexes), volumes, qtrees, LUNs (logical unit number), and the like. The storage containers are managed by one or more storage servers in the data storage system and are independent of the logical representation.

The method further includes executing a conformance check that compares the state of the storage system to a policy for the storage system and automatically provides a user with a list of proposed remedial tasks, actions. The list of actions can be based on the degree of non-conformance. The list of proposed actions can be evaluated by the severity of the potential impact to the system. Actions that can have potentially severe effects on the system (such as copying an entire storage volume that is heavily loaded) can be grouped together and put into categories that, for example, contain actions that require administrator approval, and actions that require the intervention of the administrator. The effects of a potential change to a policy or to a data set can be estimated by evaluating the potential change by using the conformance checker. The impact of the potential change can thus be evaluated by an administrator before sending the changes to a conformance engine that commits the changes to the system. Thus, using a conformance checker can vastly reduce the workload determining and correcting conformance of data sets to management policies. The data sets, storage objects, and data management policy are further discussed below.

System Overview

Figure 1:
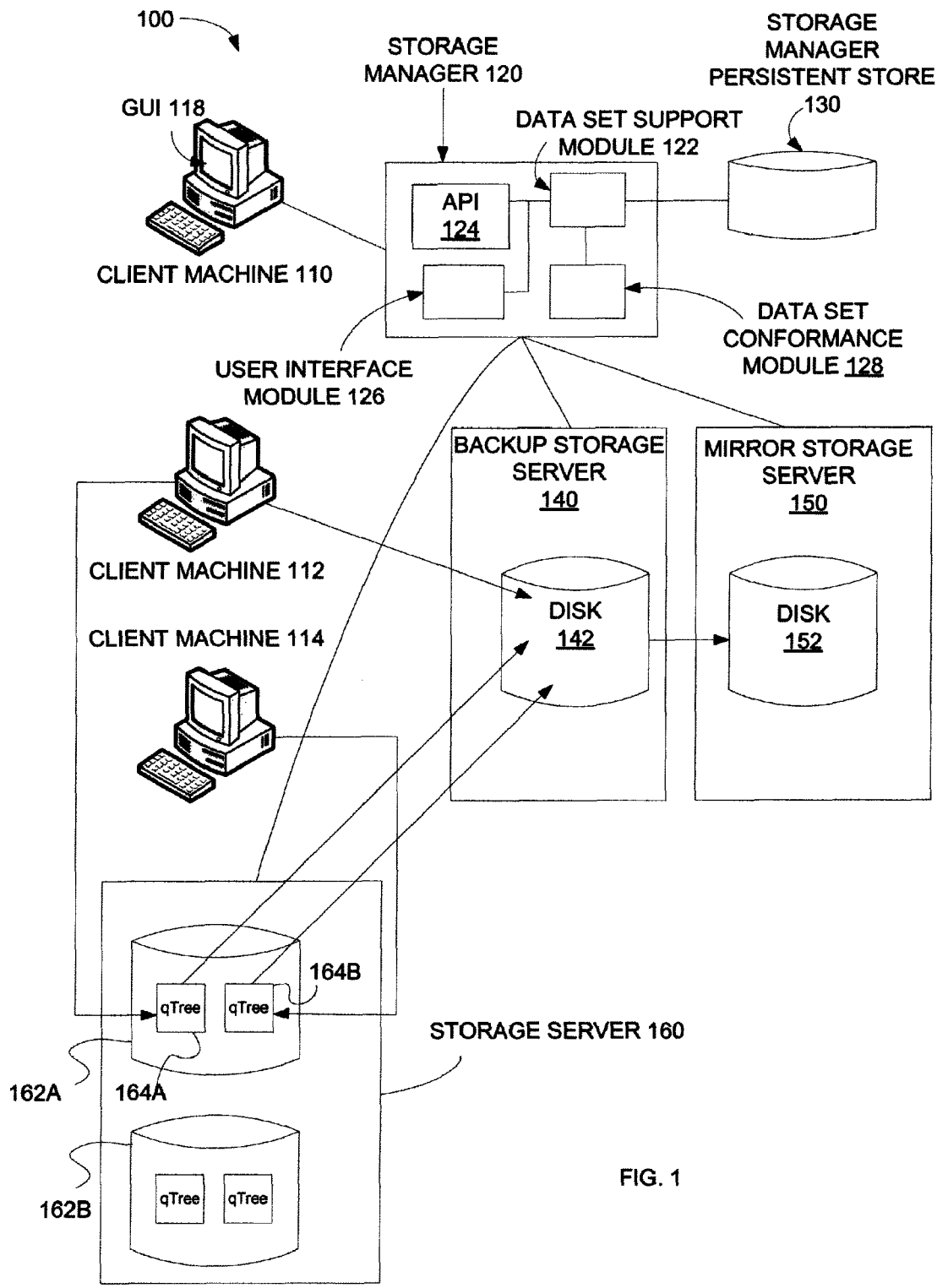
FIG. 1 illustrates an embodiment of a networked storage system.

FIG. 1 shows a networked data storage system 100 according to some embodiments of the present invention. The system 100 includes client machines 110, 112, and 114, a storage manager 120, a storage manager persistent store 130, a storage server 160, a backup storage server 140, and a mirror storage server 150. The above components can be coupled to each other through one or more of various types of networks, such as local area network (LAN), wide area network (WAN), etc. Moreover, the networked connection may be wireline, wireless, or a combination of both. As such, the above components may or may not be located at different geographical locations.

In one embodiment, data is stored and transferred in units of files in the data storage system 100. Therefore, the system 100 may be a file-based networked storage system. In such an embodiment, the system 100 can be a network-attached storage (NAS) system that provides clients with access to data at the file level. A NAS system uses file access protocols to retrieve data, such as, for example, Network File System (NFS), or Common Internet File System (CIFS). The files are logically arranged into directories. A volume of storage devices may be mapped to one or more directories. Alternatively, the system 100 may include or be part of a storage area network (SAN), to provide clients with access to data at the block level of storage servers. A block is the basic unit used to store data in the SAN.

Note that any or all of the components of system 100 and associated hardware may be used in various embodiments of the present invention. However, it can be appreciated that other configurations of the networked data storage system 100 may include more or fewer devices than those discussed above.

In one embodiment, the client machine 110 is used by a storage administrator, and thus, may be referred to as an administrative client. In contrast, the other client machines 112 and 114 are used by users of the network data storage system 100 to access data, and thus, may be referred to as storage clients. Of course, a storage client and an administrative client may not be mutually exclusive, that is, both the administrator and users may use the same client machine in some embodiments. The client machines 110, 112, and 114 may be implemented on personal computers (PCs), laptop computers, special purpose computing devices, etc. The client machines 110, 112, and 114 often belong to users that work for different organizations and/or groups.

Figure 4:
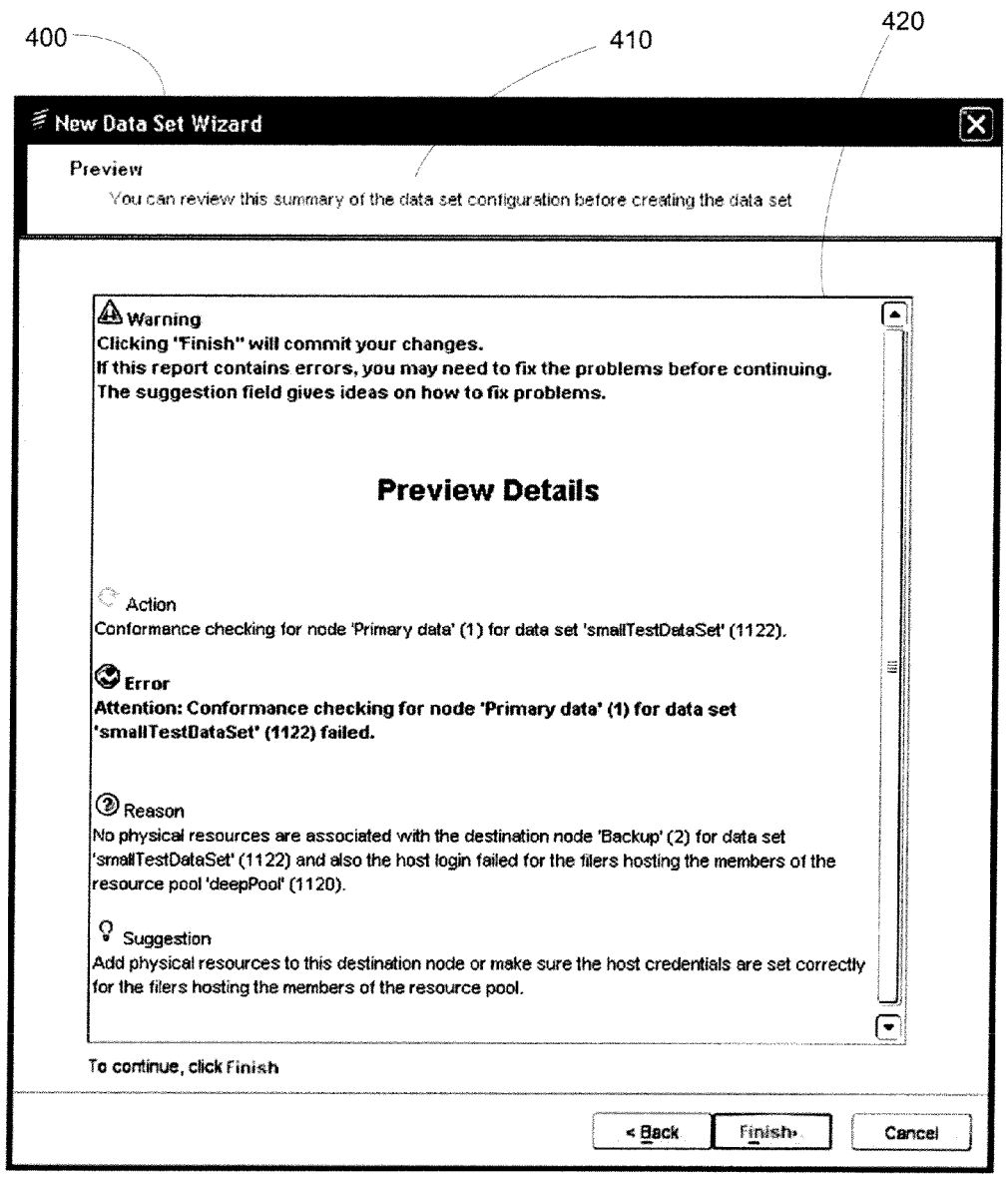
FIG. 4 illustrates an embodiment of GUI for request processing for a stateless conformance engine.

Still referring to FIG. 1, the client machine 110 is coupled to the storage manager 120, which is further coupled to the storage manager persistent store 130. The storage manager 120 is an application that is used by an administrator to implement and manage data storage solutions (such as where a group's data should be stored and how it should be backed-up). The storage manager 120 may be implemented on one or more servers, personal computers (PCs), special-purpose computing machines, etc. The storage manager 120 may include an application programming interface (API) 124 to interface with the client machine 110. Further, the storage manager 120 may include a data set support module 122 to manage data sets and implement related policies. The storage manager may also include a data set conformance module 128 to, for example, manage conformance of storage solutions to a defined storage management policy. The storage manager 120 may further include a user interface module 126 to create a user interface (e.g., graphical user interface (GUI), command line interface (CLI), etc.) and to provide the user interface to the client machine 110 via the API 124. In some embodiments, the API 124 may be implemented on a separate server coupled between the storage manager 120 and the client machine 110. The client machine 110 includes a display (e.g., a monitor) to present the user interface (e.g., the GUI 118) to an administrator of the data storage system 100. Using the GUI 118, the administrator may input information of data sets and data management policies to the storage manager 120 and review a list of potential actions for enhancing the conformance of the system. In some embodiments, the GUI 118 is presented via a network access application, such as an interne browser, to the administrator. An exemplary embodiment of screen displays of the GUI 118 is illustrated in FIG. 4.

Based on the administrator inputs, the data set support module 122 creates, removes, and/or updates data sets, where each data set is associated with a data management policy. Objects representing the data sets and the data management policy are stored in the storage manager persistent store 130. The storage manager persistent store 130 may be implemented using a storage device that stores data persistently, such as a disk, a read-only memory (ROM), etc. Using the data sets and the data management policies, the storage manager 120 manages data in the data storage system 100. More details of the data sets, data management policies, and data management using data sets are discussed below.

In addition to the client machine 110 and the storage manager persistent store 130, the storage manager 120 is further coupled to the storage server 160, the backup storage server 140, and the mirror storage server 150. It should be apparent that the storage servers 140, 150, and 160 are shown in FIG. 1 as examples for illustrative purpose only. Other embodiments of the data storage system ay include more or fewer storage servers, each storage server managing a set of physical storage devices, such as magnetic disks, optical disks, tape drives, etc., in different configurations.

Still referring to FIG. 1, the storage server 160 manages two disks 162A and 162B. The disks 162A and 162B may hold various storage containers, either in whole or in part. A storage container is a unit for storing data, such as a file, a directory, a qtree, a volume, a LUN, etc. For instance, the disk 162A holds two qtrees 164A and 164B. As another example, a disk may hold part of a volume, where the volume spans multiple disks.

The client machines 112 and 114 may access the disks managed by the storage server 160. For example, the client machine 112 stores data in the qtree 164A, while the client machine 114 stores data in the qtree 164B. To protect the data in the qtrees 164A and 164B, the storage server 160 may send the data in the qtrees 164A and 164B to the backup storage server 140, which creates a backup copy of the data in the qtrees 164A and 164B in the disk 142. In addition, the backup storage server 140 may further mirror the disk 142 onto the disk 152 managed by the mirror storage server 150. In some embodiments, the client machine 112 may store data in an internal disk (not shown) and have the internal disk backed up in the disk 142 managed by the backup storage server 140. Note that the above are merely one example of data protection policy topologies. It should be appreciated that many different data protection policy topologies may be implemented in the syste 100. Thus the use of system can cause the conformance of a storage solution to a policy to change, for example, when resources are not available to meet user demand.

As the numbers of storage servers and disks grow in the networked data storage system 100, the workload as well as the complexity of data management increases. Thus, it becomes more difficult for the administrator to manage the effects of changes to a data storage system to bring it into conformance. In order to improve efficiency and to reduce the potential for adversely affecting the system 100, the storage manager 120 automatically determines conformance (for example, on a periodic basis, or in response to user input) according to data management policies from the administrator before potential solutions are applied to the system. Details of data sets and the use of data sets are discussed below.

Data Sets and Storage Objects

To efficiently manage data, the data set support module 122 in the storage manager 120 uses data sets to manage data in some embodiments. In one embodiment, a data set includes references to a set of storage objects associated with a data management policy. The data management policy is applied to the data set, directing how the administrator wishes the data in the storage objects to be managed as a single unit. In other words, a data set is a collection of storage objects grouped by virtue of the storage objects to be managed as a single unit so that the same data management policy and any changes thereof is applied to each storage object of the data set. For example, a storage object may be defined to be a home directory of an employee in a company group, which is a member of a data set of the home directories of all employees in the company division. The storage objects may be referred to as members of the data set. Thus, each set of data stored for different divisions of a company can be managed individually by referencing the data set (and associated policies) of each division. Before going further into the details of the data set and the data management policy, details of a storage object are described below.

A storage object may include a logical representation of a collection of data in one or more storage containers and replicas of the collection of data (e.g., a mirrored copy of the data and/or a backed up copy of the data). Referring back to the above example, a logical representation of the storage object of the employee's home directory may be the employee's identification (ID), such as "jsmith." The collection of data may be created by users or the administrator of the data storage system 100. In some embodiments, the data of a storage object is stored in a storage container or a set of storage containers (e.g., the disk 162) managed by one or more storage servers (such as the storage server 160) in the data storage system 100. For example, the content of the employee's home directory in the above example may be stored in the qtree 164A in the disk 162A.

Some examples of storage objects include qtrees, volumes, directories, etc. These examples may also be referred to as elementary storage objects because they are logical representations of data in basic units of storage in the networked data storage system 100. Further, a storage object may be a reference to a collection of elementary storage objects, such as a reference to all volumes managed by a storage server.

Note that the state of the storage containers is independent of the logical representation of the data. Thus, the data is not necessarily managed by where the data is stored or how the data is accessed. Rather, the data is managed by the logical representation, which may be associated with the content of the data. For example, the data may be a word processing document, "employee_review.doc") stored in the disk 162A. In the current example, the logical representation may be the name of the document (e.g., "employee_review.doc"). The storage manager 120 may manage the document by the name of the document (i.e., "employee_review.doc"), rather than by the storage container (e.g., the disk 162A in the current example) or the set of storage containers in which the document is stored. The state of the disk 162A is independent of the name of the document (e.g., "employee_review.doc") stored in the disk 162A. As such, the storage object, as well as the data set having the storage object, are not bound to any actual physical location or storage container and may move to another location or another storage container over time. For example, the storage containers associated with a data set may become obsolete in performance over time, and the storage manager 120 may therefore move the data to a set of new storage containers, with or without alerting the administrator. Any movement of data sets may be substantially transparent from the administrator's perspective in order to provide a separation of the logical representation from the physical location. Thus, the storage manager 120 may rebalance resources to enhance conformance (e.g., the disks 162A, 162B, 142, and 152) in the data storage system 100 over time. In other words, the data set provides the virtualization of the physical storage containers used to hold the data.

In some embodiments, a data set includes user created data as well as meta data. Meta data generally is information about the user-created data. Examples of meta data include exported names, language settings, storage server association, LUN mappings, replication configuration, quotas, policies, consistency groups, etc. Meta data may be used to move or restore the corresponding data set. A complete data set backup (i.e. both user data and meta data) is thus useful in handling disaster recovery scenarios. If the storage system (e.g., a file server) that hosts the primary storage set associated with the data set is destroyed, the data set may be reconstructed on another storage server using another storage set that is a replica of the primary storage set to provide client data access without manual configuration by the administrator.

Operations on Data Sets

In some embodiments, the storage manager 120 may perform various operations on a data set. Some examples of operations include changing or modifying an associated data management policy of a data set, provisioning new members in a data set, listing members in a data set, adding members to a data set, deleting or removing members from a data set, migrating a data set to a different set of storage containers, generating performance views specific to a data set, generating storage usage reports of a data set, setting quota on a data set or individual members within a data set. Each of the operations is capable of changing the conformance of a data set to an associated data management policy. The above list is not an exhaustive list of all of the possible operations.

Data Management Policy

As mentioned above, the storage objects in the data set are associated with a data management policy. In general, a data management policy includes a description of the desired behavior of the associated data set. For instance, a data management policy may describe how the storage should be used and configured. One exemplary data management policy is a data protection policy, which describes how storage objects in a data set should be protected. Attributes associated with a data management policy are abstracted at the highest level possible, allowing implementation of underlying technology to change over time without adversely impacting the administrator. The use of abstraction in specifying data management policies allows attributes of the data to be described using terms the administrator is comfortable with out having to understand the technicalities of how the storage manager 120 implements the details. The state may be modified without violating or impacting the data management policy. Thus, the administrator may be shielded from the implementation details of various underlying implementations that allow the data set to be upgraded without the administrator having to be aware of all of the implementation details.

Once the administrator has added the desired members to the data set, the storage manager 120 can automatically start applying the data management policy associated with the data set to all members in the data set. For instance, the storage manager 120 can configure storage objects in the data set, schedule backup of the storage objects in the data set, etc., according to the data management policy. A conformance checker module can produce a list of actions to be executed to bring the state of the data set into compliance. The list of actions provides an approximation of the "effort" that would be required to bring a "snapshot" of the ever-changing configuration of the storage system into conformance (for example, a snapshot relationship between the root node and a secondary node that has not been implemented can require considerable bandwidth to implement). This approach provides a "stateless" conformance check (because the checker works on the system as it is at a point in time) rather than by using a conventional state-machine approach where each change is typically modeled using an "if-then" approach, where actions are specified for each contingency. When approval is given for performing the changes listed by the conformance check, a second conformance check is run (on the system as it now exists), which provides stateless conformance checking (because the second conformance check does not necessarily depend on the state of the first conformance check).

As discussed above, various tasks in the task list that typically could be expected to cause relatively large changes can be presented to administrator for the administrator's approval and/or intervention (whereas tasks that typically could be expected to have relatively minor changes can be pre-approved, for example). Approval from other users (such as a supervisor) can be required before executing tasks that typically can be expected to cause relatively large changes. The secondary approval allows the work flow of a user to be managed, which can reduce the risk of negative impacts on system performance.

Storage Manager

Figure 2:
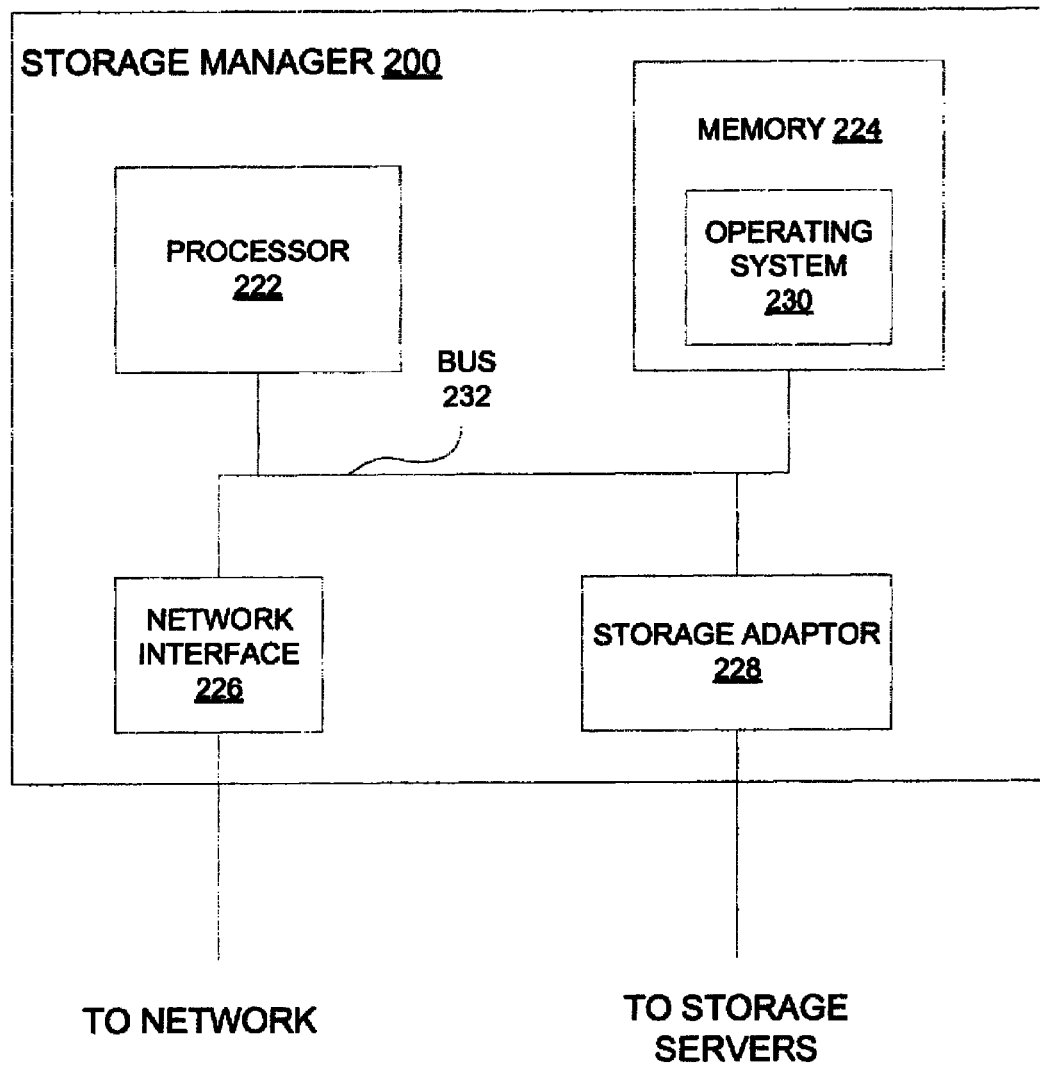
FIG. 2 illustrates an embodiment of a storage manager.

One embodiment of the storage manager 120 may be implemented on a server as illustrated in FIG. 2. Referring to FIG. 2, the storage manager 200 includes a processor 222, a memory 224, a network interface 226, and a storage adaptor 228, which are coupled to each other via a bus system 232. The bus system 232 may include one or more buses and/or interconnects. The storage manager 200 communicates with a network (e.g., the Internet) via the network interface 226, which can be an Ethernet adaptor, fiber channel adaptor, etc. The network interface 226 may be coupled to a public network, a private network, or a combination of both in order to communicate with a client machine (such as the client machine 110) usable by an administrator of the data storage system.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. The memory 224 stores instructions of an operating system 230. The processor 222 may retrieve the instructions from the memory 224 to run the operating system 230. The storage manager 200 interfaces with the storage servers (e.g., the storage server 160) via the storage adaptor 228, which can be a small computer system interface (SCSI) adaptor, fiber channel adaptor, etc.

User Interface

Figure 3:
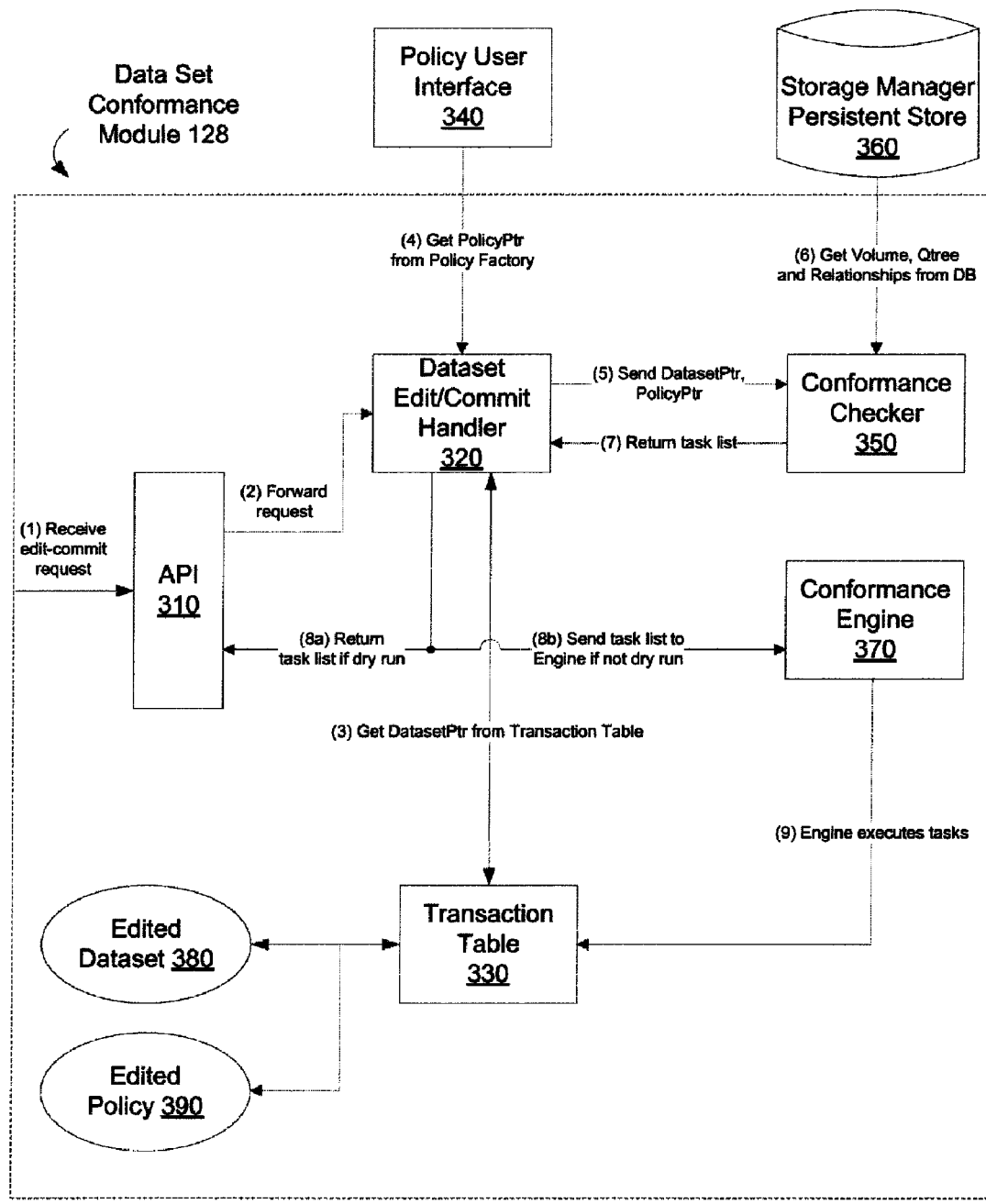
FIG. 3 illustrates an embodiment of a data set conformance module.

In one embodiment of the data set, conformance module 128 may be implemented on a server as illustrated in FIG. 3. Referring to FIG. 3, data set conformance module 128 includes an API 310, a data set edit/commit handler 320, a transaction table 330, a policy user interface 34A, conformance checker 350, a storage manager persistent store 360, a conformance engine 370, an edited data set 380, and an edited policy 390 (data set conformance module 128 is an example of data set conformance module 128).

Figure 5:
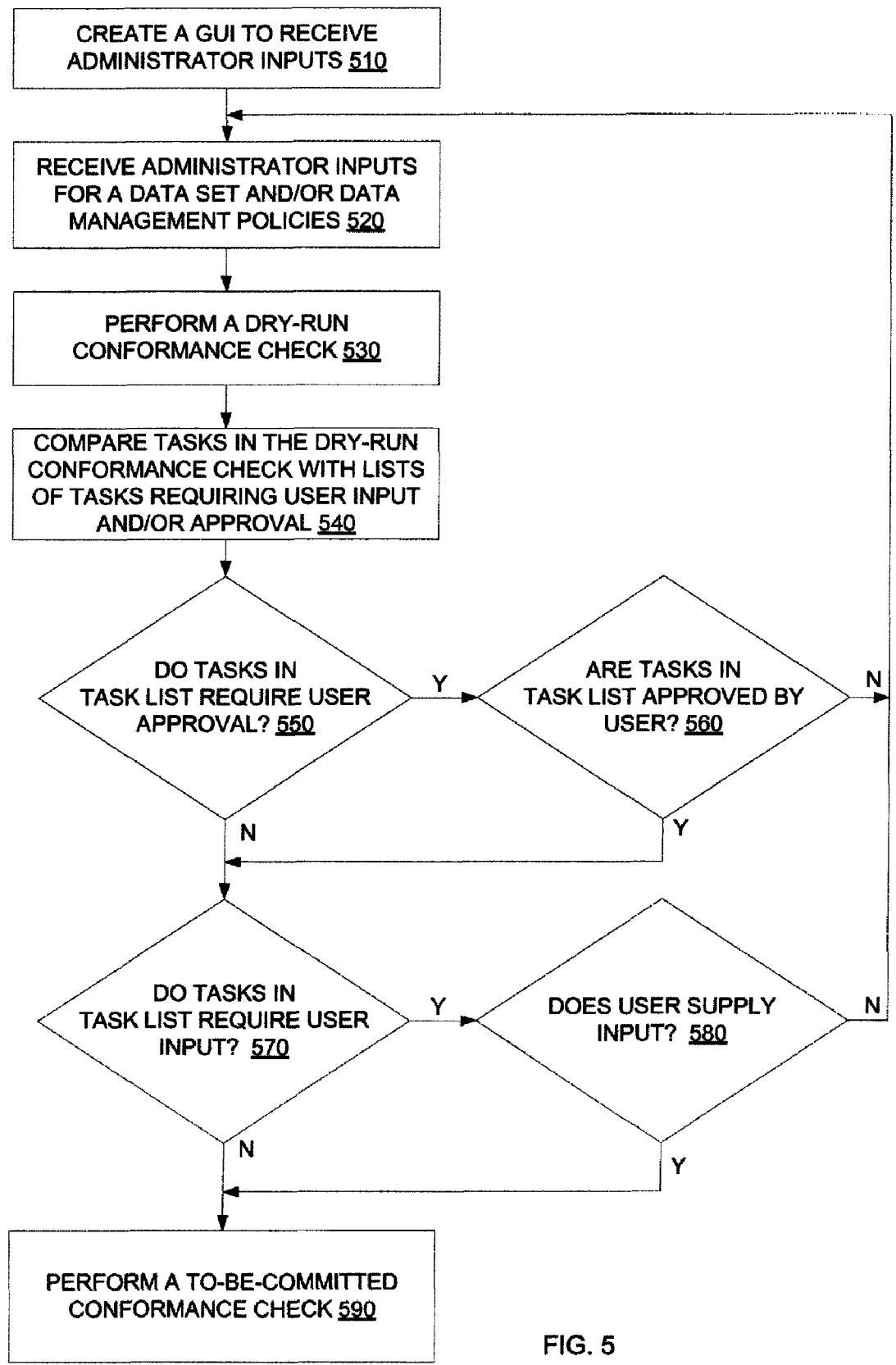
FIG. 5 illustrates a flow diagram of an embodiment of request processing for a stateless conformance engine.

The operation of data set conformance module 128 can be understood with reference to FIG. 5. FIG. 5 illustrates a flow diagram of one embodiment of a process to provide conformance checking in a data storage system using data sets. The process is performed by processing logic that is typically hosted by the storage manager 120 that comprises hardware (e.g., circuitry, dedicated logic, etc.), or software (such as is run on a general-purpose computer system or a dedicated machine, such as the storage manager 120 in FIG. 1), or a combination of both.

Referring to FIG. 5, processing logic creates a GUI to receive inputs from an administrator of the data storage system (processing block 510). Processing logic then receives administrator inputs on data sets and/or data management policies (processing block 520). For example, the administrator may provide information via the GUI to define data sets (e.g., names and description of the data set, storage objects to be included in the data set, etc.) and to define data management policies (e.g., a data protection policy). The provided information is passed via an API 310 to data set edit/commit handler 320. The data set edit/commit handler 320 then causes the conformance checker to perform conformance check of the defined or edited data sets and/or associated policies specified by the administrator (processing block 530). The conformance checker 350 produces a list of tasks to take actions to bring the system into conformance (as discussed below, complete conformance is not always possible, such as when not enough memory is available for storage objects).

The task list is evaluated the data set edit commit handler 320 to determine which tasks in the task list require user input or approval. The determination can be made, for example, by comparing whether a task to be performed is included in a list of tasks that require user approval and/or a list of tasks that require user input (processing logic 540).

When tasks in the task list require user approval (processing logic 550), the processing logic can present the tasks to a user, for example, by using a GUI as described above (processing logic 560) to obtain user approval. When a user does not approve of a task, the processing logic can return to processing logic 520 where the user can provide further edits. (In an alternate embodiment, tasks that are not approved can be removed from the list and the processing logic can continue at processing logic 570.) When tasks in the task list require user input (processing logic 570), the processing logic 570 can present the tasks to a user using a GUI to obtain input from a user to be used to execute tasks in the task list requiring user input. When a user does not provide input for a task, the processing logic can return to processing logic 520. (In an alternate embodiment, tasks that for which a user does not supply input can be removed from the list and the processing logic can continue at processing logic 590.) At processing logic 590, the processing logic runs a new conformance check, and uses a conformance engine to execute (and commit) the conformance tasks generated by the conformance checker. Thus, a conformance check can be run on a system having an arbitrary data set state, suggest solutions, and bring a system into better conformance with or without human intervention.

Referring to FIG. 3, data set conformance module 128 performs conformance checking to determine whether volumes, qtrees, backup relationships and mirroring relationships match the intent of the administrator when the administrator defined a data set and applied a policy to the data set. If the data set conformance module 128 determines that the implementation of the data policy to the data set does not match the data set policy, module 128 then can execute the necessary tasks to bring the data set state into conformance with the data set policy.

Conformance checking can be performed in various situations. For example, when a policy is applied to the data set for the first time, the data set state will normally not be in conformance. Conformance checking can also be applied when an administrator has edited the data set, or edited a policy (using a policy user interface 340 for example, which is a GUI for creating, editing and managing policies: the edited policies can be stored in persistent store 360), or changed various resources used by the data set. In such cases, the data set conformance module 128 identifies, and if appropriate, executes, tasks to bring the data set state into conformance with the data set policy. (Because a single policy can be applied to many different data sets, editing the single policy can cause many different conformance checks to be run with each conformance check determining the conformance of each data set that is associated with the edited policy.)

The conformance checker 350 checks the conformance to a data management policy by examining relationships of the storage objects of the data set to other storage objects as specified by the data management policy. For example, a data set includes three volumes, namely, volume A, volume B, and volume C. The data set is associated with a data management policy that specifies some backup and mirroring relationships between the volumes. Specifically, the data management policy specifies that volume A should be backed up on volume B and volume B should be mirrored to volume C. Then the data set conforms to the data management policy if volume A is backed up on volume B and volume B is mirrored to volume C. On the other hand, the data set violates the data management policy if volume A is not backed up on volume B, and/or volume B is not mirrored to volume C. (In other words, the data set violates the data management policy if the storage objects are not related to each other as specified in the data management policy.) Moreover, the data management policy may specify more details on the relationships between the storage objects (e.g., the frequencies of backup and mirroring). More details on how the conformance checker 350 determines if a data set conforms to or is in violation of a data management policy are described below.

Conformance checking can also be applied when various physical resources and the data set state change outside of the control of the data set conformance module 128. An example of a data set state change outside of the control of data set conformance module 128 includes an administrator adding a volume to a storage server that is associated with the data set. When the administrator adds a volume to the storage server, the data set conformance module 128 "discovers" the new volume and works to identify (and if appropriate, execute) tasks to protect the contents of the new volume.

A task includes one or more specific machine-executable or machine-readable instructions to cause a storage server to perform a specific function, such as to create a storage object, to create a relationship between a set of storage objects, to delete a storage object, etc. For example, when the conformance checker 350 determines that the data set is not in conformance with the data management policy because there is no existing storage object in the data set to backup a storage object, the conformance checker 350 may generate a task including instructions to prepare a storage object in order to create a new storage object. The task may further include the parameters of what needs to be done in order to make the data set conform to its policy. Some of the above questions may lead to situations irresolvable by the conformance checker 350. For example, if the data set does not contain enough storage objects to provide a backup, the conformance checker 350 cannot resolve this issue unless the administrator supplies more storage objects. The tasks corresponding to these situations are considered to be irresolvable. Other tasks are resolvable, meaning that the conformance checker 350 has enough information to decide on the appropriate corrective action. The conformance checker 350 puts the tasks generated into a task list.

As discussed above, some of the generated tasks can be excessively source-intensive, and are thus brought to the attention of an administrator. For example, operations such as backup and mirroring baseline transfers are extremely resource-intensive. Accordingly, the conformance checker 350 generates a task list to be performed so that a list of such operations can be presented to the administrator for approval. For less resource intensive operations (e.g., reserving more storage space on a storage element) the conformance engine 370 can automatically execute the tasks to bring the data set state into conformance without human intervention. The administrator can specify a list of certain operations having a higher probability of great impact, so that the administrator can be notified automatically.

For example, a backup task has not been executed on schedule (perhaps because enough storage is no longer available), and thus is identified as a nonconformity by the conformance check. Because the task is (for example) included in a notification task list requiring administrator approval to execute, the administrator is notified of the nonconformity, so that the administrator can lessen the impact of implementing the change (such as scheduling the task to run at night, or assigning more storage elements).

Figure 7:
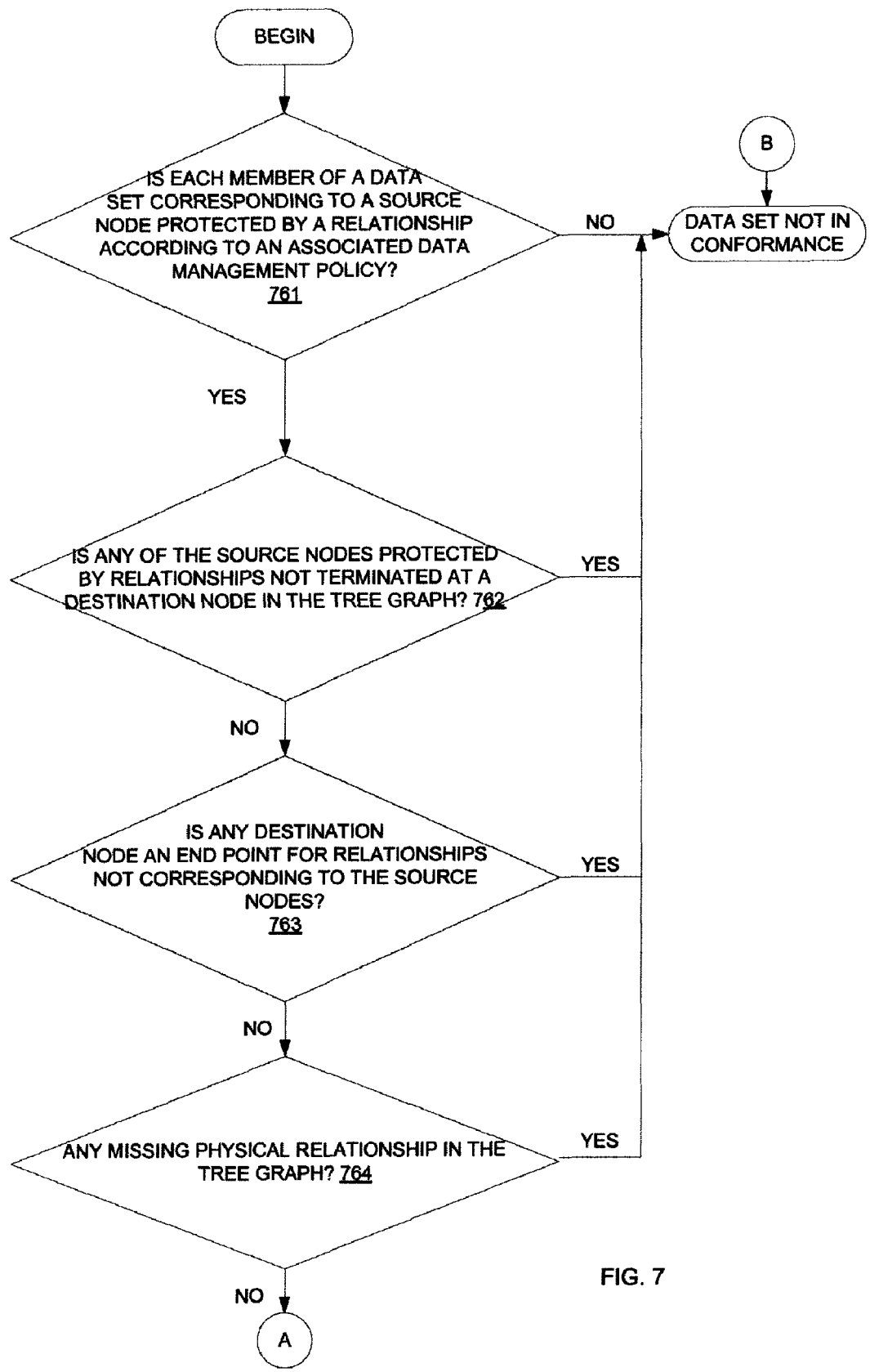
FIGS. 7 and 8 illustrate a flow diagram of one embodiment of a process performed by a conformance checker to determine if a data set is in conformance with a data management policy.

The function of the conformance checker 350 is normally separated from conformance engine 370: The conformance checker determines what actions should be taken, whereas the conformance engine implements the actions to be taken. The separation of the conformance engine from the conformance checker allows the user to evaluate the potential effects of executing the task list before the task list is executed. Conformance checker 350 takes as input a data set definition and an associated policy. Referring now to FIG. 7, the conformance checker 350 determines if each child node of the data set corresponding to a parent node of the tree graph is protected by a relationship between storage servers according to the policy (block 761). For example, the policy may require volume A to be mirrored to volume B, where volume A is on storage server A and volume B is on storage server B. Then the conformance checker 350 checks whether there is a mirroring relationship between storage server A and storage server B. If not, then the data set is not in conformance. Otherwise, the conformance checker 350 continues at block 762 to determine if there are any source nodes protected by relationships that do not terminate at a destination node of the tree graph. If there are, then the data set is not in conformance. Otherwise, the conformance checker 350 determines if there are any destination nodes that are end points for relationships not corresponding to the source node (block 763). If there are, then the data set is not in conformance. Next, the conformance checker 350 determines if there is a missing physical relationship in the tree graph (block 764). If there is, then the data set is not in conformance. Otherwise, the process continues in FIG. 8.

Figure 8:
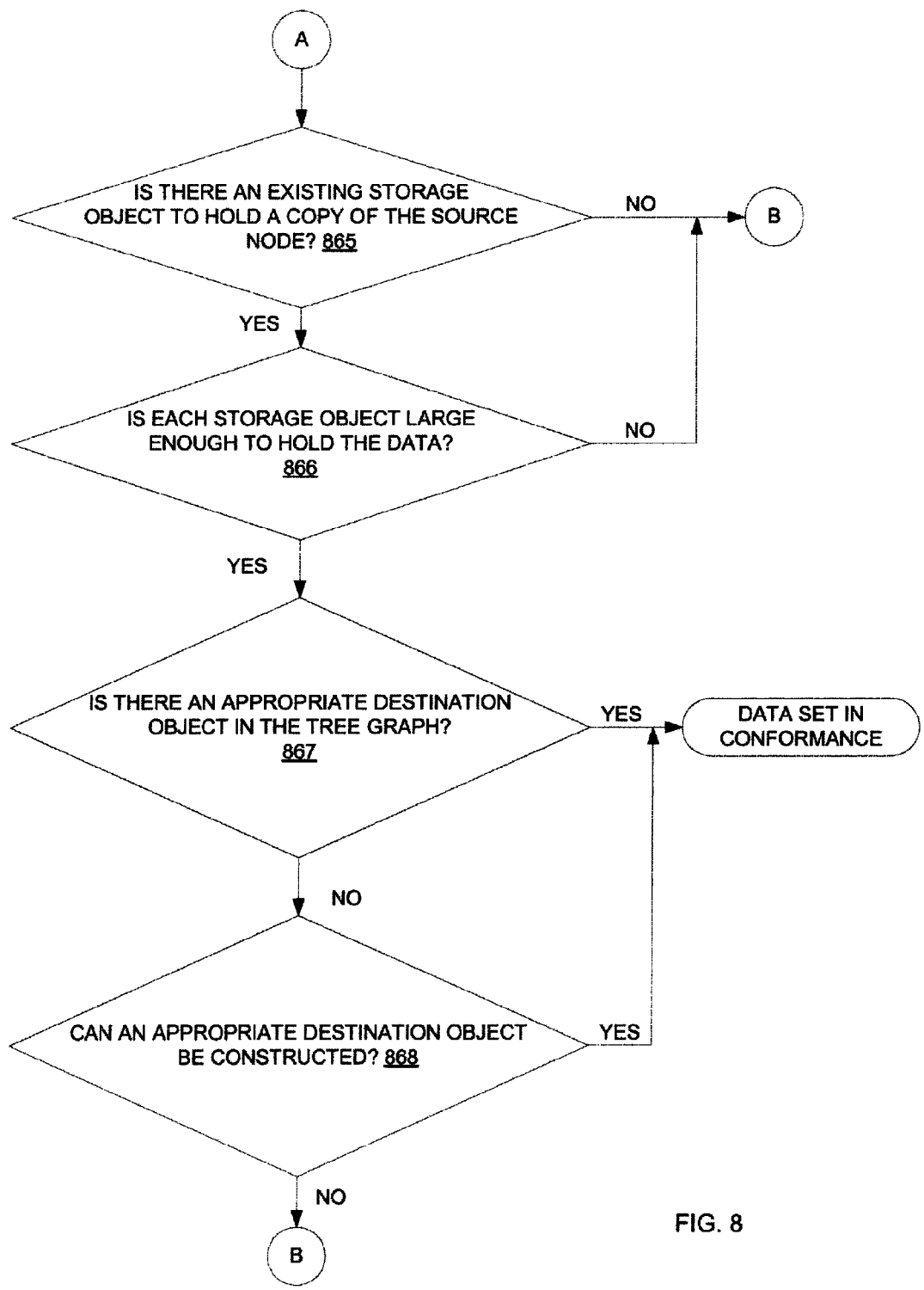

Referring to FIG. 8, the conformance checker 350 determines if there is an existing storage object already in the data set to hold a copy of the source node (block 865). If not, the data set is not in conformance. Otherwise, the conformance checker 350 determines if the storage object is large enough to hold the data (block 866). If not, the data set is not in conformance. Next, the conformance checker 350 determines if there is an appropriate destination object (block 867). If so, the data set is in conformance. Otherwise, the conformance checker 350 determines if an appropriate destination object can be constructed (block 868). If so, the data set is in conformance. Otherwise, the data set is not in conformance.

Referring to FIG. 3, when the state of the data set is not in conformance with the policy, the conformance checker 350 generates the task list to be executed as described above. Each task in the task list encapsulates information that is used to perform a particular task. The task list can be presented as a "dry-run" (e.g., a trial run without implementing the results) report to the user or given to the conformance engine 370 to be committed. The conformance engine 370 executes the tasks on the task list generated by the conformance checker 350. When the user makes a change to the configuration or policies, the effects of those changes can be approximated by running the conformance checker 350 against the modifications without committing those changes. This "dry-run" report allows the user to re-consider dramatic changes with the probable effect in mind. Using the "dry-run" report allows users to see the predicted effects of a change based on a simulated conformance check.

The control flow for executing conformance checks is now described in greater detail. When a user (such as a system administrator) starts to edit an object (such as a data set, policy, or schedule), an edit session identifier is used to track the edit transaction (the edit session identifier can be obtained from the data set edit/commit handler 320, for example). The user performs edit operations on the object (for example, using a GUI from the policy user interface 340 or data set edit/commit handler 320). As the user edits the objects, each editing operation is associated with the edit identifier such that an edit operation can be correlated with the intended object. As the user performs the edits to the object, a list of (sub-)objects (within the hierarchy of the object) can be recorded in transaction table 330. For example, when a data set and an associated policy are edited, transaction table 330 contains pointers to an in-memory representation of the data set being edited (edited data set 380), and an in-memory representation of a policy being edited (edited policy 390). The in-memory representation of the policy and data set allow changes to these objects to be reviewed (e.g., by performing conformance checks) before the changes to the objects are committed (e.g., written to the storage manager persistent store 360).

When a user desires to see the potential effects (e.g., the "dry-run" results) of an edit for an object such as the data set, the user can use a graphical user interface generated by, for example, handler 320 to select a "dry-run" command. (The edit-commit request can specify whether the results are for a dry-run or to be applied to a data set.) The API 310 forwards the request to the data set edit/commit handler 320. The data set edit/commit handler 320 obtains the data set pointer for the data set being edited from transaction table 330. The data set edit/commit handler 320 also obtains a pointer to the policy (from policy user interface 340) that is associated with the data set pointer. The obtained data set pointer and a policy pointer are passed to conformance checker 350.

In another example where the object being edited is a policy, a user can be asked if the edited policy is to apply to individual data sets or is to apply to all data sets that are associated with the changed policy. Thus, at least one pointer to one of the data sets associated with the policy is passed to the conformance checker 350 because both a data set and an associated policy are used to evaluate and/or generate conformance actions.

A list of all impacted data sets (e.g., data sets to which the changed policy is applied) can be presented to the user. For example, when many data sets use a default policy and the default policy is then edited, each of the data sets would then require a conformance check (which would require relatively large amounts of CPU and bus bandwidth). The user can be notified of the amount of data sets impacted by the change to the policy so that the user can choose an appropriate way of applying the changes.

The conformance checker 350 can obtain information (such as volumes, qtrees, and relationships thereof) for building a storage set from storage manager persistent store 360. The conformance checker 350 performs the conformance check by traversing the nodes of the structure of the objects for which pointers were passed. The nodes can be traversed using a breadth-first traversal, although depth-first traversal and/or combinations thereof can be used. During the traversal, the conformance checker 350 looks for conformance actions to be taken for a data set to generate a storage set that is in conformance with a pointed-to policy. The conformance checker 350 does not have to be aware that the edited object implementation has not yet been committed to (and physically implemented in) the data set (because of for example, the in-storage representations of the edited objects 380 and 390).

Figure 6:
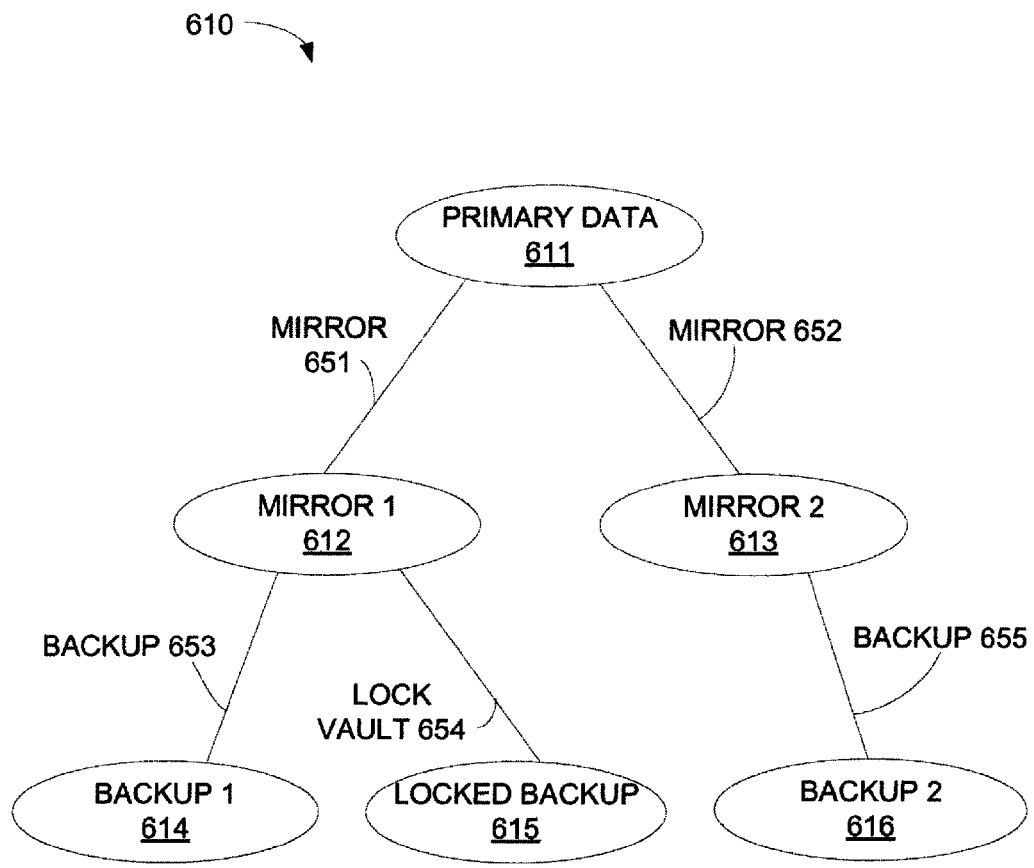
FIG. 6 illustrates a tree graph of one embodiment of a data management policy.

For example, a directory structure (such as data structure 610 shown in FIG. 6) can be traversed to check for conformance. According to an embodiment of the present invention, conformance checker visits each node in the structure (i.e., traverses the structure) to identify nodes that represent directories and places these nodes into a processing queue. Various algorithms can be used to traverse a hierarchical structure to identify nodes that represent directories. These algorithms can differ in the order in which the nodes are visited. In one implementation, a breadth-first search (BFS) algorithm is used to traverse the data structure. Briefly, using this method, the traversal of the structure begins at the root and explores all the neighboring nodes. A neighboring node is a node that is connected to a node that is being traversed. Then for each of those nearest nodes, it explores their unexplored neighbor nodes, and so on, until there are no more nodes in the structure. The following steps describe the BFS algorithm as used in the present invention to traverse directory structure 610 shown in FIG. 6:

1. Put the root node in the queue (e.g., node 611);
2. Pull a node from the beginning of the queue and examine it (e.g., node 611);
3. If the node is a directory node and there are no more nodes in the structure, stop the traversal;
4. Otherwise push all the (so-far-unexamined) successors of this node e.g., nodes 612 and 613) into the end of the queue, if there are any;
5. If the queue is empty, every node in the structure has been examined—discontinue the search and return "not found";
6. Repeat from Step 2.

As a result of traversing structure 610 using the BFS algorithm, the queue will include the following directory nodes: 611, 612, and 613. According to other embodiments, the traversal of the structure can be performed using a depth-first-search (DFS) algorithm. A person of ordinary skill in the art would understand that other algorithms that produce similar results can be used to traverse a hierarchical data structure.

For each node traversed, a storage set (e.g., nodes 614 and 615) that is associated with an encountered node (e.g., node 612) is determined by the conformance checker 350 (e.g., a list of storage elements used to implement storage for the node is determined by the conformance checker 350). For the determined storage set, a list of volumes, qtrees, backup relationships, and mirroring relationships that originate in the storage set are evaluated to determine ingoing (towards parent nodes) and outgoing (towards child nodes) relationships are defined by the list. For each outgoing connection from the source storage set to a destination storage set, the conformance checker 350 verifies that there is a corresponding backup or mirroring relationship from each volume or qtree in the source storage set that terminates in a volume or qtree in the destination storage set. Where redundant or unnecessary backup or mirroring relationships are found after checking over each volume and qtree in a source storage set, the conformance checker 350 can generate a task to delete those relationships.

When the conformance checker 350 determines that a new backup or mirroring relationship is desired, a corresponding destination volume is selected. The conformance checker 350 can optionally use an existing volume, or it can provision in a new volume from a resource pool. Typically, the conformance checker 350 attempts to reuse volumes that are already used by the data set.

For each node of a storage set, the conformance checker 350 verifies that each volume in a storage set contains sufficient memory space to implement the provisioning policy. When a flexible volume (e.g., a logical storage container inside an aggregate) in a storage set does not contain sufficient memory to implement a desired backup or mirroring relationship, the aggregate data set containing the flexible volume can grow the volume by using an assigned resource pool. Additionally, some backup or mirroring relationships can be moved to new volumes already in the storage set that contain sufficient memory. If sufficient memory space cannot be found, the user can be notified.

The conformance checker 350 can free additional memory by determining whether any backups or snapshots of storage are not required by a data set policy. For example, a list of backups for each storage set is maintained, and each backup in the list has an expiration date. Conformance checker 350 can consult the list of backups and delete any backup versions that are past their retention date. After deleting backup versions, snapshots holding those backup versions can also be deleted by conformance engine 370. The conformance checker 350 can generate tasks in a task list to indicate that those snapshots should also be deleted.

Each task that is generated by the conformance checker 350 encapsulates all the information (or pointers to the information) that is used to perform the task. For example, each task typically contains an "execute task method" that does the actual work of executing the task. Each task also has a "user message member," which is used to provide a human-readable description of what the task is intended to accomplish. The user message member is used to present a message to users when the request a dry-run before executing the task list using the configuration engine 370.

Each task can also have an equivalence operator method (e.g., A==B, which means "A is equivalent with B"), which is used when queuing numerous tasks. When a pending task is to be queued, the conformance checker 350 searches the tasks already queued in the configuration engine 370 to determine whether an equivalent task has already been queued. Where an equivalent task has already been queued (for example, when pending task "A" is equivalent to queued task "B"), the pending task can simply be skipped.

When the conformance checker 350 has completed the conformance check, the generated task list is sent to the data set edit/commit handler 320. The data set edit/commit handler 320 determines whether the generated task list is for dry-run results or is to be committed. The data set edit/commit handler 320 can make the determination by referencing an edit identifier that is associated with the generated task list and the original edit request. If the edit-commit request specified a dry-run, the results are passed back to the API 310 for display (see FIG. 4 below). If the edit-commit request specified a commitment, the generated task list is sent to the conformance engine 370, where the conformance engine 370 executes the tasks to commit the changes implicated by the tasks. Conformance engine 370 can use transaction table 330 and local in-memory copies of edited data set 380 and edited policy 390 to implement the changes. (Note: the results of the to-be-committed conformance check are often not the same as the results of the dry-run conformance check due to dynamic changes in the data set state that are beyond the immediate purview of the administrator.)

FIG. 4 illustrates one embodiment of a GUI, generated by the storage manager 120, to enable an administrator to review the details of a conformance check. Referring to FIG. 4, a GUI 400 for reviewing the details of a conformance check is shown. The GUI 400 may be displayed via a window created by the client machine 110 in FIG. 1. The GUI 400 includes a field 410 for indicating that the details are being previewed (e.g., the results of a dry-run). Pane 420 indicates the actual details generated by the conformance checker. In the example, conformance checking policy "primary data" with data set "smallTestData set" reveals an error and the reason for the error (no physical resources are associated with the destination node). A suggestion is given to the user on how to solve the problem (e.g., add physical resources or check host credentials). Thus, conformance of the data set and policies applied to the data set can be quickly evaluated and resolved through user interaction before changing the state of the data set. The state of the data set can be changed by the user clicking the "Finish" button.

Process to Manage Data

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms is, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a machine-accessible medium, also referred to as a computer-readable medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-implemented method comprising:
performing a dry run conformance check to identify a non-conformance of a data set state to an associated data management policy for storing and managing data, wherein the data set state includes a plurality of storage objects each having a state;
identifying a set of tasks that can be performed to increase conformance of the data set state to the associated policy;
generating a dry-run task list using tasks from the identified set of tasks;
outputting an indication of the dry-run task list to a user;
accepting from the user an approval of the dry-run task list before performing a to-be-committed conformance check;
performing the to-be-committed conformance check to generate a commit task list, the to-be-committed conformance check being independent or the data set state of the dry run conformance check; and
executing a task list based on an identifier associated with the task list that indicates whether a task list is to be executed, wherein a dry-run task list is not to be executed and a commit task list is to be executed.

2. The method of claim 1, wherein performing the dry run conformance check is in response to a change in the relationship between the data management policy and the data set.

3. The method of claim 1, wherein performing the dry run conformance check is done on a periodic basis.

4. The method of claim 1, further comprising providing a notification list of tasks for which approval is required before executing any task listed in the notification list.

5. The method of claim 4, further comprising requiring human approval before executing a task listed in the notification list.

6. The method of claim 4, further comprising requiring notifying a user of irresolvable nonconformities before executing, a task listed in the notification list.

7. The method of claim 4, further comprising displaying details of the notification list to a user for review.

8. The method of claim 7 further comprising displaying to the user a number of objects impacted by the dry-run task list before executing the commit task list.

9. The method of claim 1 further comprising accepting from a second user an approval of the dry-run task list before generating and executing the commit task list.

10. The method of claim 4, further comprising displaying an amount of storage required to implement the task list.

11. The method of claim 4, wherein the user is notified when a sufficient amount of storage required to implement the task list is not available.

12. The method of claim 1, wherein the identifier is an edit identifier, and wherein the edit identifier is assigned to a request to perform a conformance check and is associated with a task list that is generated in response to the request to perform a conformance check.

13. The method of claim 12, further comprising freeing storage elements used by storage objects storing backup information past an expiration date in response to an insufficient storage space error.

14. An apparatus comprising:
a user interface module to receive a request to perform a dry run conformance check wherein the request identifies a data set and a data management policy;
a conformance checker to perform the dry run conformance check to generate a dry-run task list of actions to increase the conformance of a data set state to the associated policy, wherein the dry-run task list is displayed to a user using the user interface module, the conformance checker further to perform a to-be-committed conformance check to generate a commit task list in response to approval of the displayed dry-run task list by the user, the to-be-committed conformance check being independent of the data set state of the dry run conformance check; and
a conformance engine to execute a task list based on an identifier associated with the task list that indicates whether the task list is to be executed, wherein a dry-run task list is not to be executed and a commit task list is to be executed.

15. The apparatus of claim 14, further comprising:
an application programming interface (API) coupled to a storage manager that is used to manage the data set identified by the conformance check request.

16. The apparatus of claim 14, wherein the user interface module displays an indication of irresolvable tasks in the generated dry-run task list to a user.

17. The apparatus of claim 16, wherein the user interface module receives user input in response to the indication of irresolvable tasks before executing the second task list.

18. The apparatus of claim 17, wherein the user interface module further receives an approval from the user to commit the displayed tasks to the data set state.

19. A data storage system comprising:
a plurality of storage servers; and
a storage manager operable to provide a user interface to allow an administrator of the data storage system to define a data set hosted by the storage servers, to associate the data set with an owner and a data management policy, and to monitor the data set as a single unit as the data management policy is implemented, the storage manager comprising:
a conformance checker to perform a dry run conformance check in response to a change in the relationship between the data set and the data management policy, a dry-run task list being generated by the dry run conformance check, the conformance checker further to perform a to-be-committed conformance check in response to user edits to the dry-run task list to generate a commit task list, the to-be-committed conformance check being independent of the data set state of the dry run conformance check;
a handler to display the dry-run task list to a user and to receive user edits to the dry-run task list; and
a conformance engine to execute a task list based on an identifier associated with the task list to increase conformance of a data set state and the data management policy, the identifier indicating whether the task list is to be executed, wherein a dry-run task list is not to be executed and a commit task list is to be executed.

20. The data storage system of claim 19, wherein the conformance engine increases the conformance of the data set state and the data management policy in response to an input of approval from the user.

21. The data storage system of claim 20, wherein the system displays to the user to suggest user responses to irresolvable nonconformities in the dry-run task list.

22. A non-transitory machine-accessible medium that stores instructions which, if executed by a processor, will cause the processor to perform operations comprising:
performing a dry run conformance check of a data set state and an associated data management policy, wherein the data set state includes a plurality of storage objects, and wherein a storage manager is used to manage the data set as a single unit according to the data management policy;

generating a dry-run task list of actions to increase the conformance of the data set state of the data set and the associated policy;

displaying to a first user suggested user responses to non-conformities in a task list and displaying tasks from the generated dry-run task list that are included in a predetermined list of actions;

receiving approval from the first user and a second user for performing selected tasks from the dry-run task list;

generating a commit list of tasks to be executed by a conformance engine to increase actual conformance of the data set state and the associated policy, the commit list of tasks being generated by performing a to-be-committed conformance check that is independent of the data set state of the dry run conformance check and including at least one approved task from the dry-run task list; and determining if a task list is to be executed based on an identifier associated with the task list, wherein the dry-run task list is not to be executed and the commit list of tasks is to be executed.

23. The non-transitory machine-accessible medium of claim 22, wherein the operations further comprise:

executing the commit list of tasks.

* * * * *